United States Patent

Ai

[19]

[11] Patent Number: 6,152,694
[45] Date of Patent: Nov. 28, 2000

[54] TIP SHROUD FOR MOVING BLADES OF GAS TURBINE

[75] Inventor: Toshishige Ai, Takasago, Japan

[73] Assignee: Mitsubishi Heavy Industries, Ltd., Tokyo, Japan

[21] Appl. No.: 09/242,739

[22] PCT Filed: Jun. 18, 1998

[86] PCT No.: PCT/JP98/02690

§ 371 Date: Feb. 23, 1999

§ 102(e) Date: Feb. 23, 1999

[87] PCT Pub. No.: WO99/00584

PCT Pub. Date: Jan. 7, 1999

[30]     Foreign Application Priority Data

Jun. 26, 1997  [JP]  Japan ................................... 9-170182

[51] Int. Cl.$^7$ ...................................................... B64C 11/24
[52] U.S. Cl. ........................... 416/92; 416/97 R; 416/191
[58] Field of Search ................................ 416/97 R, 96 A, 416/191, 192, 92; 415/176, 178

[56]          References Cited

U.S. PATENT DOCUMENTS 5,464,486  11/1995  Rao .

FOREIGN PATENT DOCUMENTS

| 49-93712 | 9/1974 | Japan . |
| 57-28803 | 2/1982 | Japan . |
| 58-47104 | 3/1983 | Japan . |
| 3-194101 | 8/1991 | Japan . |
| 4-47101 | 2/1992 | Japan . |
| 1426049 | 2/1976 | United Kingdom .................... 416/191 |

*Primary Examiner*—Edward K. Look
*Assistant Examiner*—Hermes Rodriguez
*Attorney, Agent, or Firm*—Wenderoth, Lind & Ponack, L.L.P.

[57]              ABSTRACT

A tip shroud (11) for a moving blade to be used at a downstream stage of a gas turbine. The tip shroud is extended in its creep lifetime by feeding it effectively with cooling air. In the tip shroud (11), there are cut-off portions (12, 13) which are passed by a hot combustion gas so that they are influenced by thermal stress. On the shroud faces, there are formed grooves (31, 32; 33, 34), and cooling guide covers (21, 22) are mounted in the grooves. The cooling guide covers (21, 22) are closed at one side with members (21a, 22a) and open at an end thereof. The covers function to cover the air holes (17) so that the cooling air is fed to the cut-off portions (12, 13) individually. The metal temperature rise at the cut-off portions (12, 13), as will be influenced by the hot combustion gas, can be suppressed so as to extend the creep lifetime of the tip shroud.

7 Claims, 6 Drawing Sheets

Fig. 7(a)(Prior Art)
Fig. 7(b)(Prior Art)
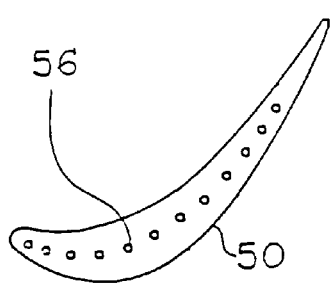
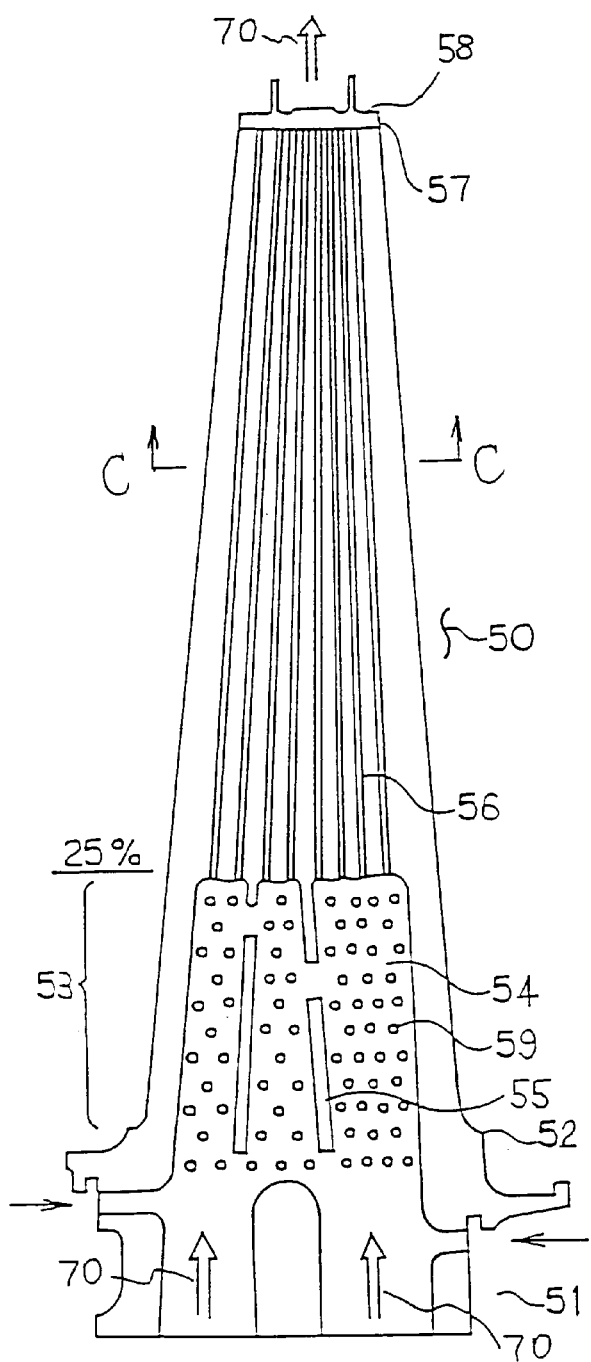

Fig. 8(a) (Prior Art)
Fig. 8(b) (Prior Art)
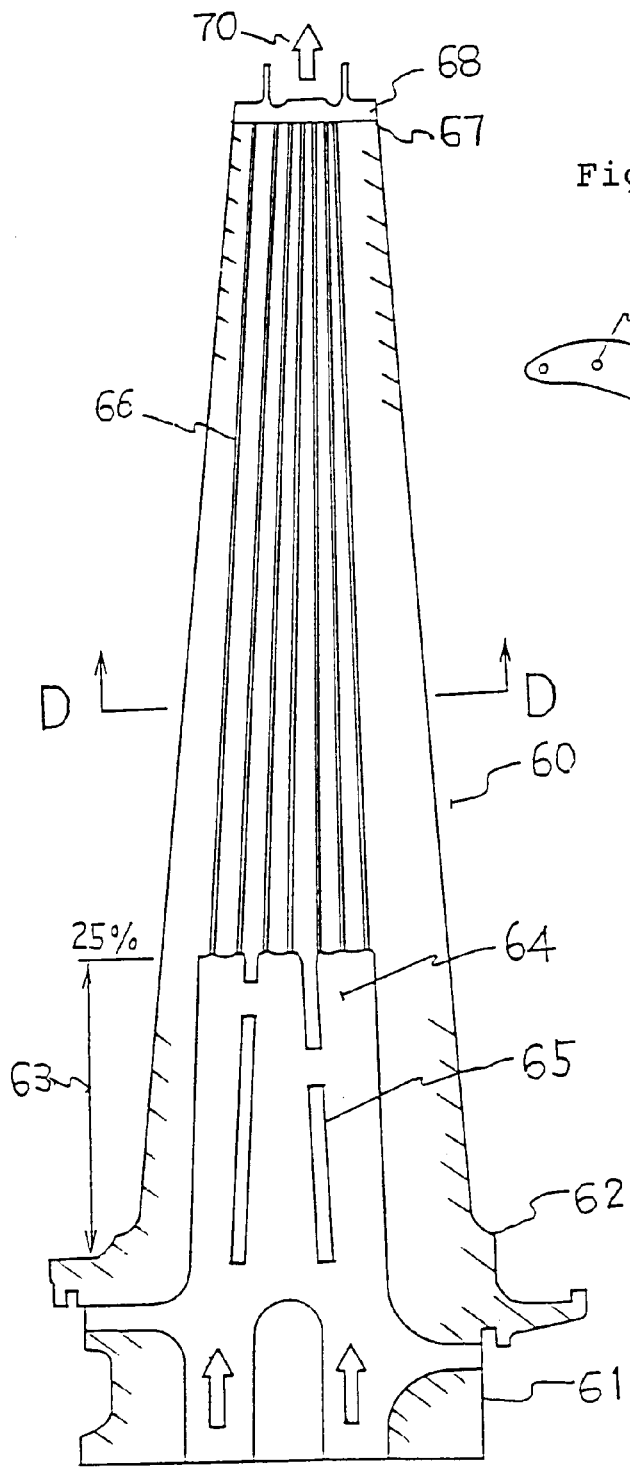
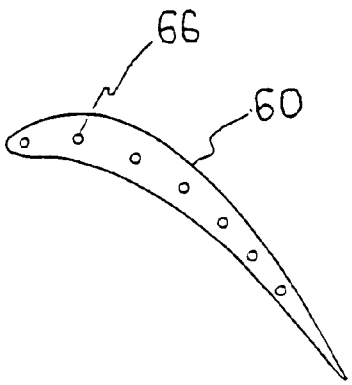

TIP SHROUD FOR MOVING BLADES OF GAS TURBINE

TECHNICAL FIELD

The present invention relates to a tip shroud for a gas turbine moving blade and, more particularly, to a tip shroud for a moving blade, which is used at a downstream stage and is made thin and light to have multi-holes therein for cooling purposes, and which is extended in its creep lifetime by cooling it effectively.

DESCRIPTION OF RELATED ART

FIGS. 8(a)–8(b) show one example of a prior art moving blade to be used at a downstream stage of the gas turbine. FIG. 8(a) is a longitudinal section, and FIG. 8(b) is a section taken in the direction of arrows D—D of FIG. 8(a). In order to enhance the effect of cooling the gas turbine, which in recent years is subject to hotter and hotter temperatures, there has been adopted a system in which a moving blade to be used at a downstream stage is made thin and light but long and in which multiple holes are formed to feed cooling air to cool the inside of the moving blade. FIG. 8 shows one example of the moving blade, in which reference numeral 60 designates a moving blade, numeral 61 a blade root, and numeral 62 a hub having an internal cavity 64 extending along a hub portion 63 by 25% of the total blade length and supported by core supporting ribs 65. Numeral 66 designates a plurality of holes or passages which are formed from the upper portion of the hub portion 63 to a blade end 67, as shown in FIG. 8(b). A tip shroud 68 is mounted on the leading end of the moving blade 60, and includes air holes for guiding the cooling air from the holes 66 so as to release the cooling air 70 to the outside.

In the moving blade 60 thus constructed, the cooling air 70 is guided from the blade root 61 into the cavity 64 to cool the cavity 64 and then flows through the holes 66 and the blade end 67 to cool the blade so that the cooling air is released, while cooling the tip shroud 68, from the air holes formed in the tip shroud 68 to a combustion gas passage.

FIGS. 7(a)–7(b) show another example of a gas turbine moving blade, which is used at the downstream stage of the gas turbine as in the example of FIG. 8. FIG. 7(a) is a longitudinal section, and FIG. 7(b) is a section taken in the direction of arrows C—C of FIG. 7(a). In FIG. 7, reference numeral 50 designates a moving blade, numeral 51 a blade root, and numeral 52 a hub having an internal cavity 54 extending along a hub portion 53 by 25% of the total-blade length and supported by core supporting ribs 55. Numeral 56 designates a plurality of holes or passages which are formed from the upper portion of the hub portion 53 to a blade end 57. A tip shroud 58 is mounted on the leading end of the moving blade 50. These structures are identical to those of the example shown in FIG. 8. In the example of FIG. 7, however, a number of pin fins 59 are provided in the cavity 54 by projecting them from the two inner wall faces or by connecting them to the two inner wall faces.

In the moving blade 50 thus constructed, the cooling air 70 flows from the blade root 51 into the cavity 54, and its flow is disturbed by the pin fins 59 to enhance the thermal conductivity and accordingly the cooling efficiency of the internal cooling air in the hub portion 53. After this, the cooling air 70 flows through the holes 56 to the blade end 57 to cool the blade 50 and the tip shroud 58. The cooling air is released from the air holes formed in the tip shroud 58 to the combustion gas passage.

As described hereinbefore, the moving blade to be used at the downstream stage of the gas turbine is made light and long, and its tip shroud is shaped so as to be exposed to the hot gas so that it is liable to crack. FIGS. 6(a)–6(b) show the moving blade and the tip shroud. FIG. 6(a) is a side elevation, and FIG. (b) is a top plan view of the tip shroud. On the leading end of a moving blade 10, as shown in FIG. 6(a), there is mounted a tip shroud 11, which is provided with flanges 14 and at its two end portions and a flange 16 at its central portion. However, the tip shroud 11 has portions at its circumferential end portions that are liable to have a concentrated thermal stress.

FIG. 6(b) is a top plan view of the aforementioned tip shroud. At the two circumferential sides of the tip shroud 11, there are cut-off portions 12 and 13 which have curved peripheries. These cut-off portions 12 and 13 are exposed to the hot gas so that the thermal stress is likely to be concentrated in these areas and cause cracks 80 and 81, as shown. Therefore, these portions have to be cooled to suppress the metal temperature as low as possible. However, these portions are so distant from the passage of the cooling air flowing out of air holes 17 of the moving blade 10 that they are hardly permit the cooling air.

SUMMARY OF THE INVENTION

It is, therefore, an object of the invention to provide a structure which is able to suppress the metal temperature of cut-off portions or the concentrated stress portions of a tip shroud of a moving blade that is to be cooled through holes at the downstream stage of a gas turbine and to extend the creep lifetime of the tip shroud, by cooling the cut-off portions effectively with the cooling air.

The invention provides the following means for achieving the above-specified object.

A gas turbine moving blade tip shroud for guiding cooling air from the root of a moving blade into the blade to guide the cooling air, having cooled the moving blade, so as to flow out from a plurality of air holes of the tip shroud. A guide cover enclosing and covering a portion of the air holes is mounted on the upper face of the tip shroud and is provided at its one end with an opening so that the cooling air may be guided from the opening to a high stress portion in the periphery of the tip shroud.

According to the present invention, the guide cover is mounted on the high stress portion of the tip shroud and encloses a portion of the air holes in the upper face of the tip shroud. The guide cover has, at its one end, an opening which is directed to feed the cooling air toward the portion that is likely to receive the influence of the hot combustion gas. This portion is cooled with the cooling air, which passes it so that the metal temperature rise is suppressed so as to prevent cracks due to thermal stress. In the tip shroud of the moving blade to be used at the downstream stage of the gas turbine, the portion susceptible to being influenced by the hot combustion gas is located at the cut-off portions having the peripheries curved at the circumferential end portions. If these cut-off portions are opened for the upper guide covers, thereby to effect the outflow of the cooling air, they are suppressed in the rise of the metal temperature so that they can be prevented from cracking.

BRIEF DESCRIPTION OF THE DRAWINGS

FIG. 1(a) is a top plan view, and FIG. 1(b) is a side elevation;

FIG. 4(a) is a top plan view, FIG. 4(b) is a side elevation of a sealed portion, and FIG. 4(c) is a longitudinal side elevation;

FIG. 5(a) is a top plan view, FIG. 5(b) is a side elevation of a sealed portion, and FIG. 5(c) is a longitudinal side elevation;

FIG. 6(a) is a side elevation, and FIG. 6(b) is a top plan view of the tip shroud;

FIGS. 7(a)–7(b) show a prior art gas turbine moving blade, FIG. 7(a) is a longitudinal section, and FIG. 7(b) is a section taken in the direction of arrows C—C of FIG. 7(a); and FIGS. 8(a)–8(b) show another example of a prior art gas turbine moving blade, FIG. 8(a) is a longitudinal section, and FIG. 8(b) is a section taken in the direction of arrows D—D of FIG. 8(a).

DETAILED DESCRIPTION OF THE INVENTION

An embodiment of the invention will be specifically described with reference to the accompanying drawings.

Figure 1A:
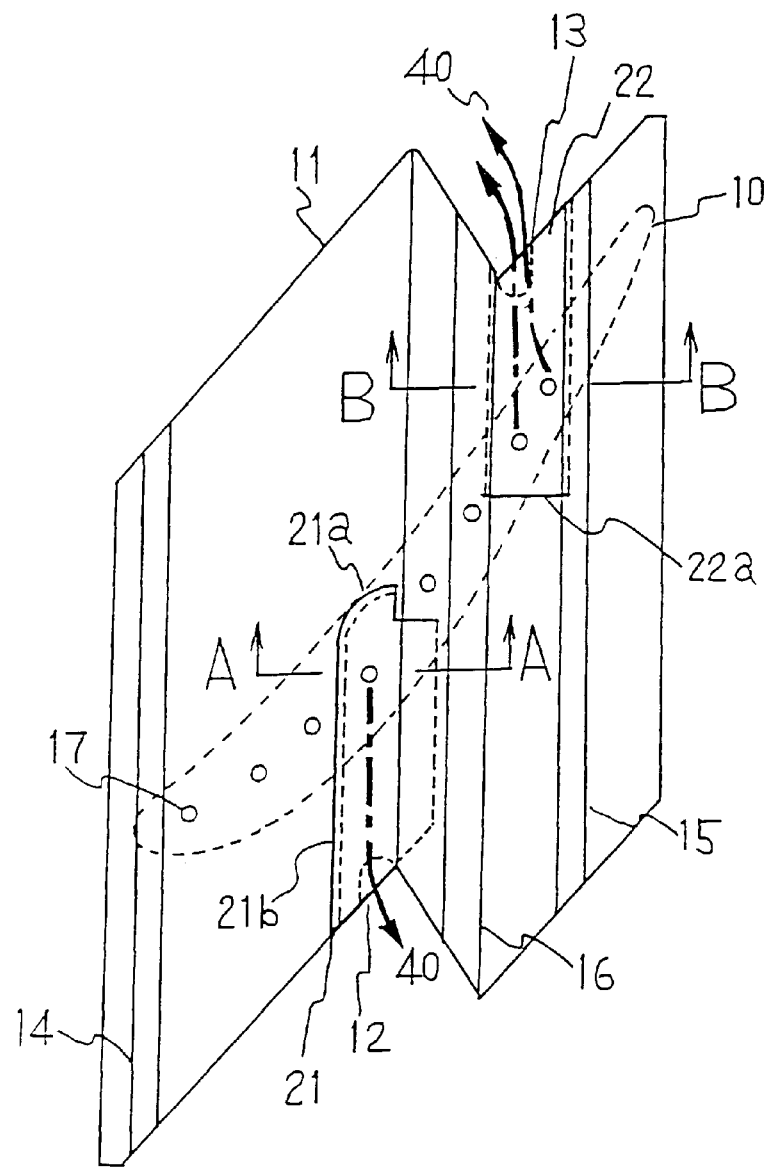
FIGS. 1(a)–1(b) show a tip shroud of a gas turbine moving blade according to one embodiment of the invention.
Figure 1B:
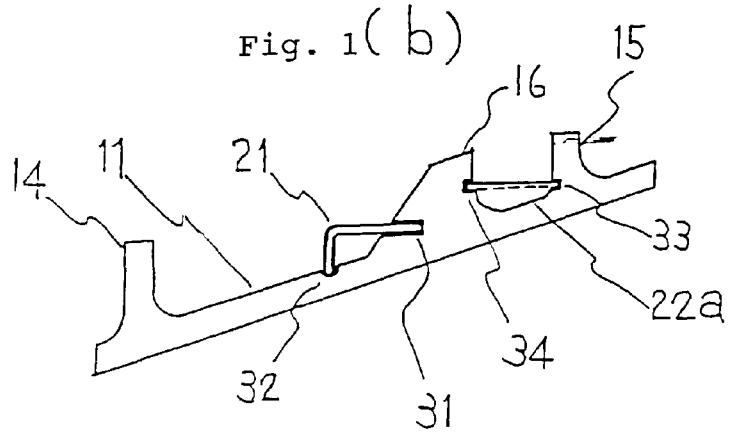

FIG. 1 shows a tip shroud of a gas turbine moving blade according to one embodiment of the invention. In particular, FIG. 1(a) is a top plan view, and FIG. 1(b) is a side elevation. In FIG. 1, reference numeral 10 designates a moving blade having a tip shroud 11. Numeral 17 designates a plurality of air holes which extend through the tip shroud 11 and communicate with the holes of the moving blade 10.

Numerals 12 and 13 designate cut-off portions which are curved at their peripheries in the two circumferential end peripheries of the tip shroud 11 such that these portions are the most subjected to thermal influences caused by hot combustion gas passing the curved portions. Numerals 14, 15 and 16 designate flanges on the upper face of the tip shroud 11. These structures are identical to those of the prior art. In the present invention, as shown in FIG. 1(b), grooves 31 and 32 are worked or formed in the side of one end of the tip shroud 11, and grooves 33 and 34 are worked or formed in the opposite side. A cooling guide cover 21 is inserted and soldered at its two ends in the grooves 31 and 32, and another cooling guide cover 22 is mounted in the grooves 33 and 34.

The cooling guide cover 21 covers one of the air holes 17, which communicates with the holes of the moving blade 10 and is worked so as to be closed at its inner side by a member 21a and at its side face by a member 21b and opened at its outer side. On the other hand, the cooling guide cover 22 also covers two of the air holes 17 communicating with the multi-holes of the moving blade 10 and is worked to be closed at its inner side by a member 22a and to be opened at its outer side.

Figure 2:
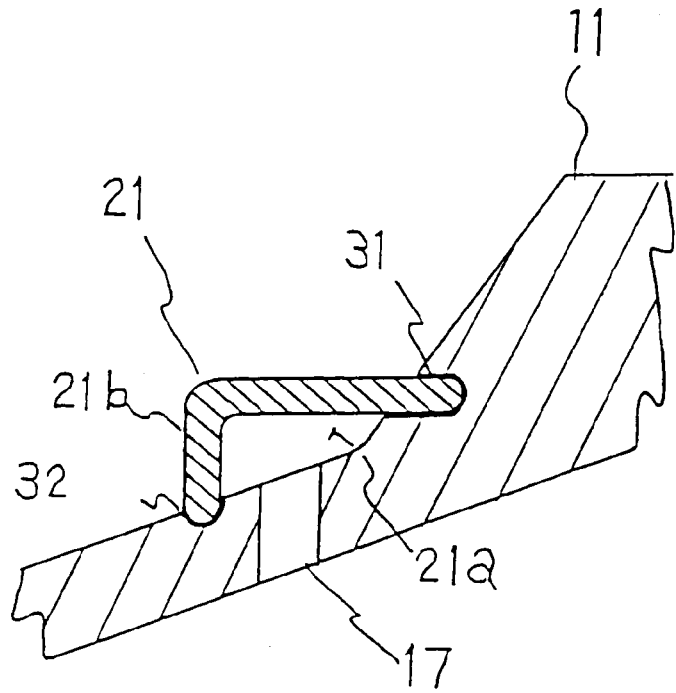
FIG. 2 is a sectional view taken in the direction of arrows A—A of FIG. 1.

FIG. 2 is a sectional view taken in the direction of arrows A—A of FIG. 1 and shows the mounted state of the cooling guide cover 21. As shown, the grooves 31 and 32 are formed in the tip shroud 11, and the cooling guide cover 21 is fitted at its end portions in those grooves to cover the air hole 17 and is shaped so as to be closed at its inner side by the member 21a and at its side face by the member 21b.

Figure 3:
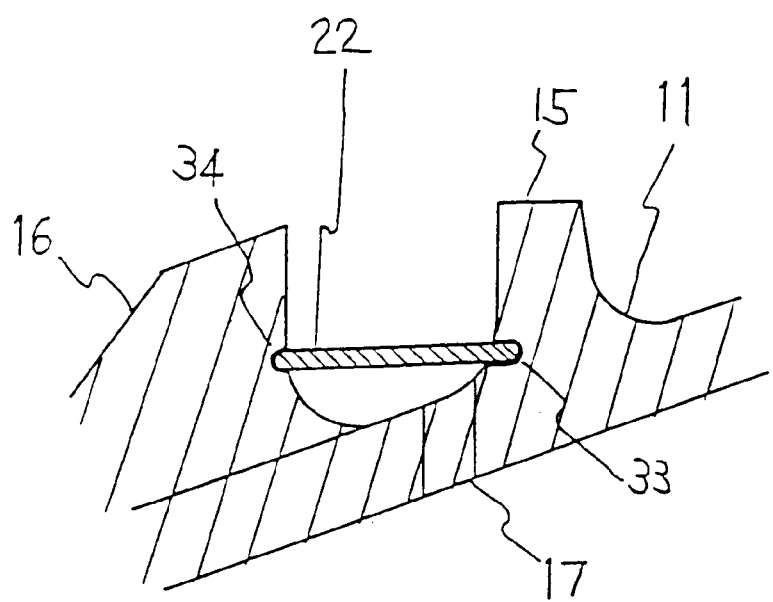
FIG. 3 is a sectional view taken in the direction of arrows B—B of FIG. 1.

FIG. 3 is a sectional view taken in the direction of arrows B—B of FIG. 1 and shows the state in which the other cooling guide cover 22 is mounted. As shown, the grooves 33 and 34 are formed in the confronting faces of the flanges 15 and 16 of the tip shroud 11, and the cooling guide cover 22 is fitted and mounted at its two ends between the grooves 33 and 34 to cover the air hole 17.

Figure 4B:
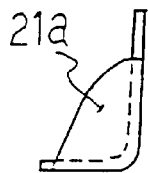
FIGS. 4(a)–4(c) show one cooling guide cover used in the tip shroud of the gas turbine according to the embodiment of the invention.
Figure 4A:
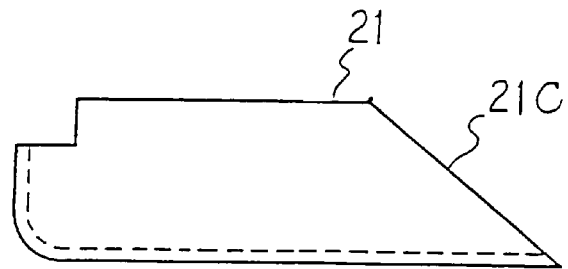
Figure 4C:
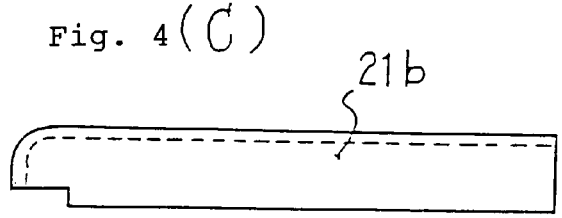

FIG. 4 shows the structure of the aforementioned cooling guide cover 21. FIG. 4(a) is a top plan view, FIG. 4(b) is a side elevation of the sealed portion, and FIG. 4(c) is a longitudinal side elevation. As shown, the cooling guide cover 21 is worked into a cover which is shaped to seal its faces to confront the tip shroud 11 with the members 21a and 21b, respectively, but to open one side 21c.

Figure 5A:
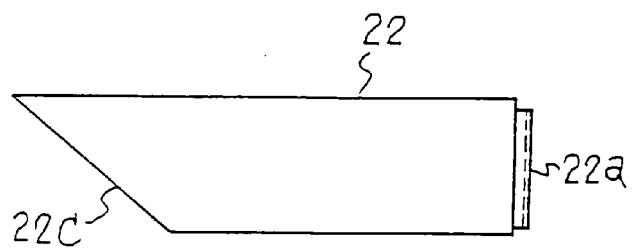
FIGS. 5(a)–5(c) show the other cooling guide cover used in the tip shroud of the gas turbine according to the embodiment of the invention.
Figure 5B:
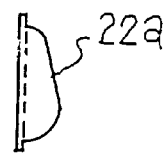
Figure 5C:
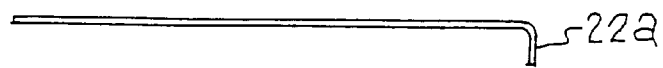
Figure 6A:
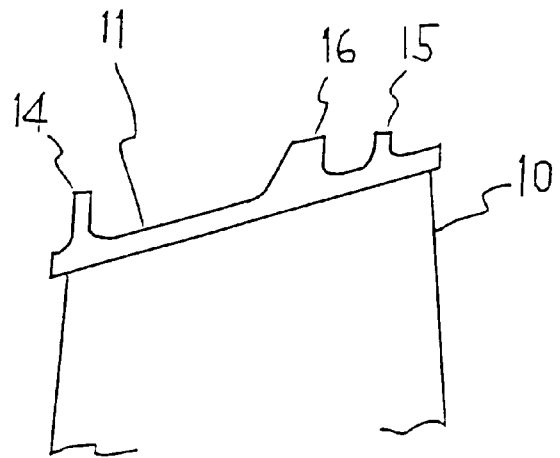
FIGS. 6(a)–6(b) show a gas turbine moving blade and a tip shroud of the prior art.
Figure 6B:
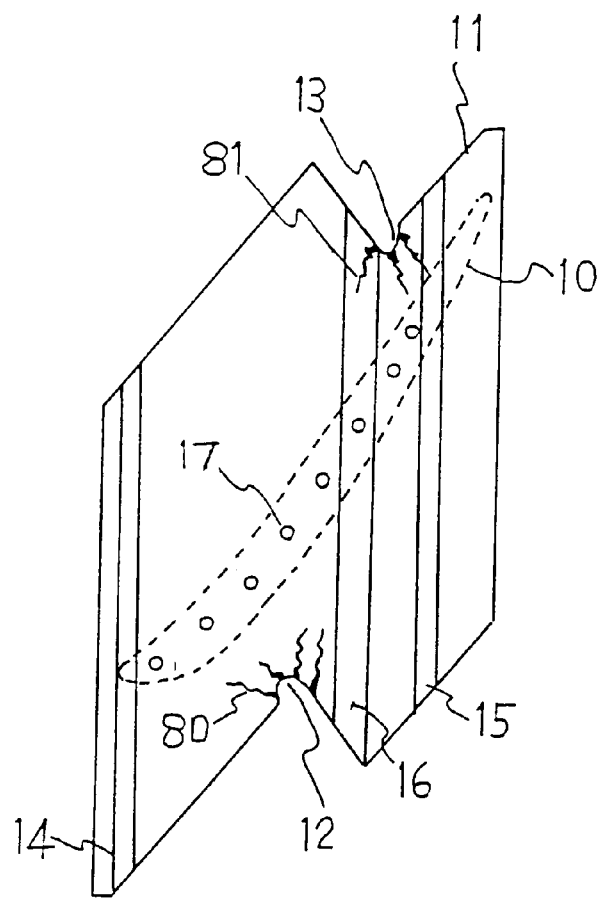

FIG. 5 shows the other cooling guide cover 22. FIG. 5(a) is a top plan view, FIG. 5(b) is a side elevation of the sealed portion, and FIG. 5(c) is a longitudinal side elevation. As shown, the cooling guide cover 22 is worked and shaped to close the space, as formed by the flanges 15 and 16 of the tip shroud 11 in conformity to the curved shape of the inner side, with the member 22a and the space, as formed by the flanges 15 and 16, with a flat-shaped cover, but to open one side 22c.

According to the tip shroud of the gas turbine moving blade of the embodiment thus far described, the cooling air from the air holes 17 can be guided to cut-off portion 12 by mounting the cooling guide cover 21 on one side of the upper face of the tip shroud 11, and the cooling air from the air holes 17 can be guided to flow to the other cut-off portion 13 by mounting the cooling guide cover 22 on the other side of the upper face of the tip shroud.

As shown in FIG. 1, more specifically, cooling air 40 from the moving blade 10 flows out of the air holes 17 to the upper face of the tip shroud 11 and further from the inside, as closed with the cooling guide cover 21, through the opening 21c and cools the surface of the cut-off portion 12 until the cooling air finally flows to the outside. On the other hand, the cooling air 40 having flown out from the air holes 17 into the other cooling guide cover 22 flows to the opposite side, as closed with the member 22a, and further flows out from the opening 22c and cools the cut-off portion 13 until the cooling air finally flows to the outside.

The cut-off portions 12 and 13 of the tip shroud 11, which provide the passages for the hot combustion gas so that the thermal stress is concentrated, are exposed to the cooling air so that the temperature of the metal at these portions can be suppressed to a low level so as to extend the creep lifetime of the tip shroud 11.

Since the cut-off portions 12 and 13 are provided with the cooling guide covers 21 and 22 to guide the cooling air to flow out from their openings, the hot combustion gas having passed the curved cut-off portions 12 and 13 of the adjoining the tip shrouds in the prior art is blocked in the invention by the cooling air so that the hot combustion gas is throttled. This further enhances the effect for those portions to suppress the temperature rise.

What is claimed is:

1. A gas turbine moving blade tip shroud for guiding cooling air received from a root of a moving blade, said gas turbine moving blade tip shroud comprising:

a plurality of air holes formed in the tip shroud;

a guide cover enclosing and covering a portion of said air holes, said guide cover being mounted on an upper face of said tip shroud, wherein one end of the guide cover is open at a high stress portion in a periphery of said tip shroud so that the cooling air may be guided from said portion of said air holes covered by said guide cover to said high stress portion.

2. A gas turbine moving blade tip shroud as claimed in claim 1, further comprising a pair of grooves formed in the upper face of said tip shroud, wherein opposite edge portions of said guide cover are received in said grooves, respectively.

3. A gas turbine moving blade tip shroud for guiding cooling air received from a root portion of a moving blade, said gas turbine moving blade tip shroud comprising:

a plurality of air holes formed in the tip shroud;

a first guide cover enclosing and covering at least one of said air holes, said first guide cover being mounted on an upper face of said tip shroud, wherein one end of said first guide cover is open at a first high stress portion in a periphery of said tip shroud so that the cooling air can be guided from said at least one air hole directly to said first high stress portion; and a second guide cover enclosing and covering at least one of said air holes, said second guide cover being mounted on an upper face of said tip shroud, wherein one end of said second guide cover is open at a second high stress portion in the periphery of said tip shroud so that the cooling air can be guided directly to said second high stress portion.

4. A gas turbine moving blade tip shroud as claimed in claim 3, wherein said first high stress portion is located at an upstream side of said tip shroud and said second high stress portion is located at a downstream side of said tip shroud relative to a flow of hot combustion gas.

5. A gas turbine moving blade tip shroud as claimed in claim 3, further comprising:

a first pair of grooves formed in the upper face of said tip shroud, wherein opposite edge portions of said first guide cover are received in said first pair of grooves, respectively; and a second pair of grooves formed in the upper face of said tip shroud, wherein opposite edge portions of said second guide cover are received in said second pair of grooves, respectively.

6. A gas turbine moving blade tip shroud for guiding cooling air received from a root of a moving blade, said gas turbine moving blade tip shroud comprising:

a plurality of air holes formed in the tip shroud;

an elongated guide cover mounted on an upper face of said tip shroud and having an open end and a closed end, said guide cover covering at least one of said air holes, wherein said closed end of said guide cover is located near said at least one air hole and said open end is located at a high stress portion in a periphery of said tip shroud, wherein said guide cover forms a channel for guiding the cooling air from said at least one air hole to said high stress portion.

7. A gas turbine moving blade tip shroud as claimed in claim 6, further comprising a pair of flanges formed on the upper face of said tip shroud and a pair of grooves formed in said pair of flanges, respectively, wherein opposite edge portions of said guide cover are received in said grooves, respectively.

* * * * *